(12) United States Patent
Gratton et al.

(10) Patent No.: US 8,896,654 B2
(45) Date of Patent: *Nov. 25, 2014

(54) METHODS AND APPARATUS FOR PROVIDING CHAT DATA AND VIDEO CONTENT BETWEEN MULTIPLE VIEWERS

(75) Inventors: Max S. Gratton, Lakewood, CO (US); Desmond Ottmar, Englewood, CO (US)

(73) Assignees: Dish Network L.L.C., Englewood, CO (US); Echostar Technologies L.L.C., Englewood, CO (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/531,228

(22) Filed: Jun. 22, 2012

(65) Prior Publication Data

US 2012/0262535 A1 Oct. 18, 2012

Related U.S. Application Data

(63) Continuation of application No. 12/046,619, filed on Mar. 12, 2008, now Pat. No. 8,223,185.

(51) Int. Cl.
*H04N 7/14* (2006.01)
(52) U.S. Cl.
USPC .................................. 348/14.04; 348/14.05
(58) Field of Classification Search
USPC ...................... 348/14.01, 14.04, 14.08, 14.05
See application file for complete search history.

(56) References Cited

U.S. PATENT DOCUMENTS

| | | | |
|---|---|---|---|
| 5,892,536 A | 4/1999 | Logan et al. | |
| 6,081,830 A | 6/2000 | Schindler | |
| 6,237,025 B1 | 5/2001 | Ludwig et al. | |
| 6,243,129 B1* | 6/2001 | Deierling | 725/105 |
| 6,256,663 B1 | 7/2001 | Davis | |
| 6,392,664 B1 | 5/2002 | White et al. | |
| 6,519,771 B1 | 2/2003 | Zenith | |
| 6,646,673 B2 | 11/2003 | Caviedes et al. | |
| 6,754,904 B1 | 6/2004 | Cooper et al. | |
| 6,925,567 B1 | 8/2005 | Hirata | |
| 6,950,503 B2 | 9/2005 | Schwartz et al. | |

(Continued)

FOREIGN PATENT DOCUMENTS

| | | |
|---|---|---|
| EP | 1225763 | 7/2002 |
| EP | 1515549 | 3/2005 |
| WO | 2007078847 | 7/2007 |
| WO | 2007105873 | 9/2007 |

OTHER PUBLICATIONS

USPTO "Non-Final Office Action" mailed Dec. 13, 2010; U.S. Appl. No. 12/239,210, filed Sep. 26, 2008.

(Continued)

*Primary Examiner* — Olisa Anwah
(74) *Attorney, Agent, or Firm* — Ingrassia Fisher & Lorenz, P.C.

(57) ABSTRACT

Various embodiments of apparatus and/or methods are described for providing communication between multiple content viewers. First video data is captured of a first user located locally with respect to a presentation device and transmitted to a base station located remotely with respect to the presentation device. The base station transmits a composite signal that includes video content provided by a content source communicatively coupled the base station and further includes second video chat data captured of a second user located remotely with respect to the presentation device. The composite signal is responsively presented by the presentation device to the first user.

17 Claims, 7 Drawing Sheets

(56) References Cited

U.S. PATENT DOCUMENTS

| | | | |
|---|---|---|---|
| 7,590,429 | B2 | 9/2009 | Hansen et al. |
| 8,063,929 | B2 | 11/2011 | Kurtz et al. |
| 2002/0144273 | A1 | 10/2002 | Reto |
| 2003/0065778 | A1 | 4/2003 | Malik |
| 2003/0126617 | A1 | 7/2003 | Tewari et al. |
| 2004/0233239 | A1 | 11/2004 | Lahdesmaki |
| 2005/0055713 | A1 | 3/2005 | Lee et al. |
| 2005/0108767 | A1 | 5/2005 | Ma |
| 2005/0130613 | A1 | 6/2005 | Kutsuna et al. |
| 2005/0246757 | A1 | 11/2005 | Relan et al. |
| 2005/0262542 | A1* | 11/2005 | DeWeese et al. ............. 725/106 |
| 2006/0109854 | A1 | 5/2006 | Cancel |
| 2006/0174312 | A1* | 8/2006 | Ducheneaut et al. ......... 725/135 |
| 2006/0248557 | A1 | 11/2006 | Stark et al. |
| 2007/0033148 | A1 | 2/2007 | Cahill |
| 2007/0107019 | A1 | 5/2007 | Romano et al. |
| 2007/0130595 | A1 | 6/2007 | McElhatten et al. |
| 2007/0198738 | A1 | 8/2007 | Angiolilio et al. |
| 2007/0199038 | A1 | 8/2007 | Choi |
| 2008/0060001 | A1 | 3/2008 | Logan et al. |
| 2008/0092168 | A1 | 4/2008 | Logan et al. |
| 2009/0031381 | A1 | 1/2009 | Cohen et al. |
| 2009/0089855 | A1 | 4/2009 | St. John-Larkin et al. |
| 2009/0167839 | A1* | 7/2009 | Ottmar ....................... 348/14.08 |
| 2009/0181702 | A1 | 7/2009 | Vargas et al. |
| 2009/0233542 | A1 | 9/2009 | Gratton et al. |
| 2013/0282824 | A1 | 10/2013 | Galbreath et al. |
| 2014/0215509 | A1 | 7/2014 | Angiolillo et al. |

OTHER PUBLICATIONS

Amendment and Response submitted Mar. 8, 2011 for Office Action mailed Dec. 13, 2010 for U.S. Appl. No. 12/239,210, filed Sep. 26, 2008.

USPTO "Final Office Action" mailed Jun. 13, 2011; U.S. Appl. No. 12/239,210, filed Sep. 26, 2008.

Amendment and Response submitted Jul. 19, 2011 for Final Office Action mailed Jun. 13, 2011 for U.S. Appl. No. 12/239,210, filed Sep. 26, 2008.

USPTO Non-Final Office Action mailed Sep. 20, 2011; U.S. Appl. No. 12/239,210, filed Sep. 26, 2008.

Amendment and Response submitted Oct. 25, 2011 for Office Action mailed Sep. 20, 2011 for U.S. Appl. No. 12/239,210, filed Sep. 26, 2008.

USPTO "Non-Final Office Action" mailed Mar. 2, 2012; U.S. Appl. No. 12/239,210, filed Sep. 26, 2008.

USPTO "Non-Final Office Action" mailed Dec. 6, 2011; U.S. Appl. No. 12/046,619, filed Mar. 12, 2008.

Amendment and Response submitted Mar. 6, 2012 for Office Action mailed Dec. 6, 2011 for U.S. Appl. No. 12/046,619, filed Mar. 12, 2008.

USPTO "Notice of Allowance" mailed Mar. 16, 2012; U.S. Appl. No. 12/046,619, filed Mar. 12, 2008.

USPTO "Non-Final Office Action" mailed Dec. 6, 2011; U.S. Appl. No. 11/964,927, filed Dec. 27, 2007.

Amendment and Response submitted Mar. 6, 2012 for Office Action mailed Dec. 6, 2011 for U.S. Appl. No. 11/964,927, filed Dec. 27, 2007.

USPTO "Non-Final Office Action" mailed Apr. 25, 2012; U.S. Appl. No. 11/964,927, filed Dec. 27, 2007.

European Patent Office "International Search Report" mailed Dec. 8, 2008; International Appln. No. PCT/US2008/077880.

European Patent Office "Extended European Search Report" mailed Apr. 8, 2011; European Patent Appln. No. 08833657.3 filed Sep. 26, 2008.

USPTO, Final Office Action for U.S. Appl. No. 11/964,927, mailed Feb. 19, 2013.

USPTO "Final Office Action" mailed Aug. 31, 2012 for U.S. Appl. No. 12/239,210, filed Sep. 26, 2008.

USPTO "Non-Final Office Action" mailed Sep. 21, 2012 for U.S. Appl. No. 11/964,927, filed Dec. 27, 2007.

U.S. Patent and Trademark Office, Non-Final Office Action mailed Oct. 7, 2014 for U.S. Appl. No. 12/239,210.

* cited by examiner

METHODS AND APPARATUS FOR PROVIDING CHAT DATA AND VIDEO CONTENT BETWEEN MULTIPLE VIEWERS

BACKGROUND

People often like to watch television programs and movies with friends and family. A group of people may gather around a television to experience their favorite television show, movie or sporting event together. Watching television is a social experience, and people often discuss topics related to the television programming. For example, when watching sports, people often like to discuss the team or the players participating in the game. However, when people are remotely located with respect to each other, it becomes difficult to maintain the social experience of watching television together.

Many people try to maintain the social experience of watching television together while they are apart by communicating over a distinct communication medium, such as a telephone. Seinfeld fans will remember when Kramer's girlfriend moves across the city, and Kramer attempts to watch a television movie while talking on the phone with his girlfriend. However, this solution has several inadequacies. It is awkward to hold a telephone while watching programming having a lengthy duration, such as movies and sporting events. Additionally, a viewer's telephone is tied up during the conversation, and they may be unable to accept phone calls from other people during the duration of the conversation. Also, one person is not able to see the physical reactions of the other participant in the conversation, which makes it difficult to fully experience the social interaction.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the reception, processing, and outputting of presentation content. More particularly, the apparatus, systems and methods described herein facilitate the transmission of audio and video chat data that may be presented on a presentation device in association with other presentation content. In short, various embodiments described herein provide apparatus, system and/or methods for providing communication between multiple viewers of presentation content at disparate locations.

In at least one embodiment, the presentation content to be received, processed, outputted and/or communicated may come in any form of a video stream. It is to be appreciated that the video stream may be supplied by any source, such as an over-the-air broadcast, a satellite or cable television distribution system, a digital video disk (DVD) or other optical disk, digital video recorder (DVR), the internet or other communication networks and the like. In at least one embodiment, the video stream may comprise both video data and audio data.

In various embodiments described herein, the chat data of a first user is captured at a first presentation device and transmitted to a second presentation device for presentation to a second user. The chat data may be captured in any format, including video data, audio data, image data, text data or any combination thereof. The chat data is then presented in association with the presentation content (e.g., broadcast video content) by the second presentation device.

In at least one embodiment, the chat data of the first user is transmitted from the first presentation device to the second presentation device via an intermediate base station. The base station further receives chat data of the second user from the second presentation device and combines the second chat data with video content from a communicatively coupled content source to form a composite signal. In at least one embodiment, the content source is located locally with respect to the second presentation device. The composite signal is further transmitted to the first presentation device for presentation to the first user. In at least one embodiment, the base station may further combine the chat data of the first user and the video content into a second composite signal that is transmitted to the second presentation device for presentation to the second user. Thus, the base station may facilitate two users watching video content from the same content source while simultaneously participating in a video chat.

Figure 1:
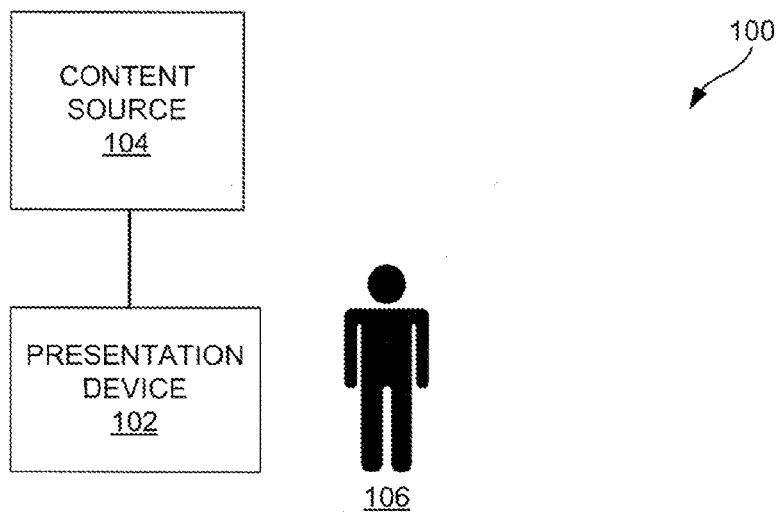
FIG. 1 illustrates an embodiment of an entertainment system.

FIG. 1 illustrates an embodiment of an entertainment system 100. The entertainment system 100 presents content to a user 106. In at least one embodiment, the content presented to the user 106 includes a video stream, such as a television program, movie or other recorded content and the like. The entertainment system 100 includes a presentation device 102 and a content source 104. Each of these components is discussed in greater detail below.

The presentation device 102 is configured to receive content from one or more content source(s) 104, and to present the received content to the user 106. In at least one embodiment, the presentation device 102 is a display device configured to display content to the user 106. The presentation device 102 may receive a video stream in any format (e.g., analog or digital format), and present the video stream to the user 106. In at least one embodiment, the presentation device 102 receives video content from the content source 104, and presents the video content in a display area of the presentation device 102. The presentation device 102 further receives chat data, and presents the chat data from the content source 104 in association with the video content. The chat data may come in any format, including audio data, video data, image data, text data or any combination thereof.

In at least one embodiment, the chat data includes audio data, and the presentation device 102 simultaneously presents the audio data with the video content received from the content source 104. If the video content includes an audio component, then the audio component and the audio chat data may be mixed together and presented through an audio output of the presentation device 102. In at least one embodiment, the audio component of the video content is muted during presentation of the audio chat data.

In at least one embodiment, the chat data includes video data, and the presentation device 102 simultaneously presents the video chat data with the video content received from the content source 104. For example, the video chat data and the video content may be presented in a picture-in-picture (PIP) or split screen mode. Thus, the video chat data may be presented in a first region of the display area of the presentation device 102, and the video content may be presented in a second region of the display area. In at least one embodiment, the video chat data and the video content both include associated audio components that are mixed together and simultaneously presented through an audio output of the presentation device 102. It is to be appreciated that the user 106 may video chat with multiple remote users simultaneously. Thus, the presentation device 102 may present multiple PIP windows, each PIP window displaying video chat data for one remote user.

The content source 104 may comprise any system or apparatus configured to provide presentation data, such as a video stream, to the presentation device 102. The content source 104 may be external or internal to the presentation device 102. The presentation device 102 and the content source 104 may be communicatively coupled through any type of wired or wireless connection, communication network and the like. Exemplary content sources include television distribution systems (e.g., over-the-air distribution systems, cable television distribution systems, satellite television distribution systems and broadband distribution systems), set-top boxes, DVD players and other optical disk players, digital storage mediums (e.g., DVRs) and the internet.

In at least one embodiment, the content source 104 further provides chat data to the presentation device 102. The originating source of the chat data may be different than the originating source of the video content. Further, the chat data and the video content may be received by the content source 104 and/or the presentation device through different communication paths. For example, the video content may be provided to the content source 104 by a satellite television provider, whereas, the chat data may be provided to the content source 104 by a remote television receiver (e.g., a remote set-top box) over an internet connection or other type of data network.

The presentation device 102 may receive the video content and the chat data in a single signal or through multiple signals. Further, the presentation device 102 may receive the video content and the chat data through a single input or multiple inputs. For example, the content source 104 may comprise a set-top box that receives broadcast video content (e.g., a television program) and video chat data and combines both signals to output a single video signal provided to the presentation device 102. In some embodiments, the presentation device 102 may receive the video chat data and the video content through multiple inputs (e.g., on two different channels), and may present the video chat data and the video content in a PIP mode. Thus, through the operation of the entertainment system 100, the user 106 is presented with chat data and other presentation content (e.g., broadcast video content) simultaneously. Entertainment system 100 may include other elements or components not illustrated for the sake of brevity.

Figure 2:
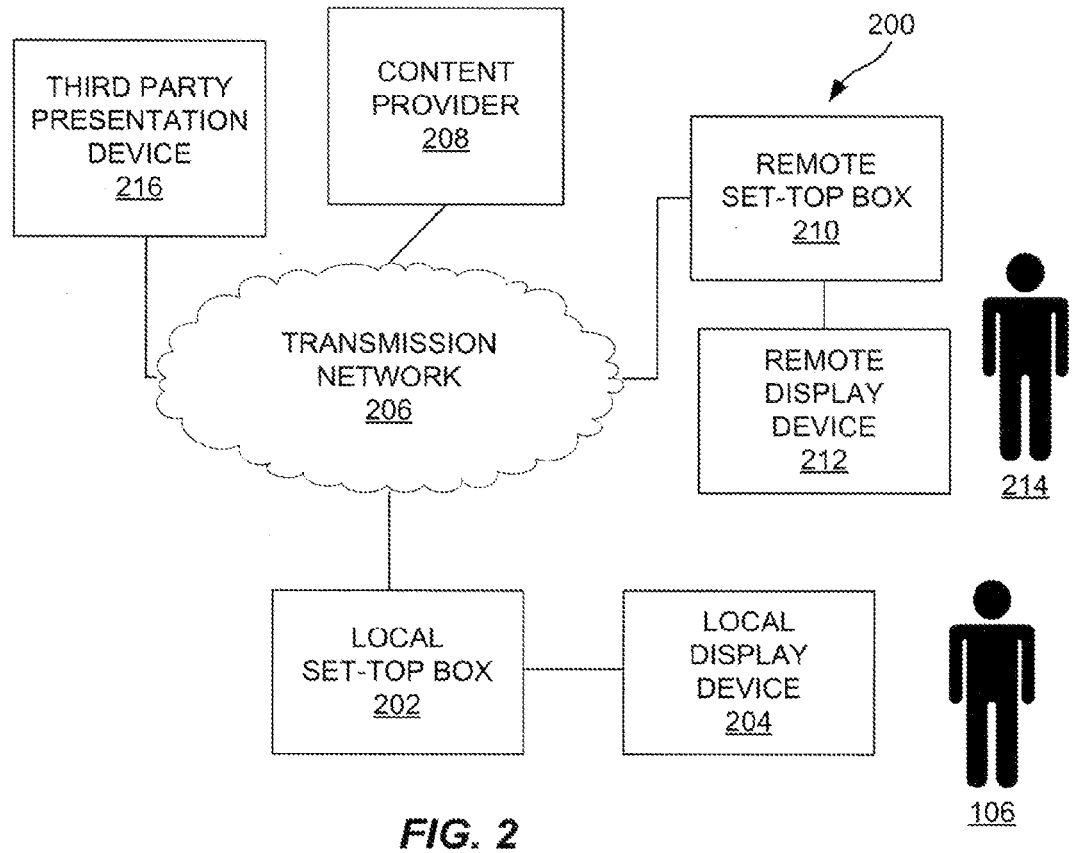
FIG. 2 illustrates an embodiment of a content distribution system.

FIG. 2 illustrates an embodiment of a content distribution system 200. The content distribution system 200 is configured to present presentation content and chat data to a user 106. More particularly, the content distribution system 200 facilitates a conversation between two remotely located users 106 and 214 through the users' television receivers. The content distribution system 200 includes a local set-top box 202, a local display device 204, a transmission network 206, a content provider 208, a remote set-top box 210 and a display device 212. Each of these components is discussed in greater detail below.

The display device 204 may comprise any type of device operable for receiving and displaying analog and/or digital video signals. In at least one embodiment, the display device 204 may be a television set or video display that contains an integrated television converter device (e.g., an internal cable-ready television tuner housed inside a television), or, alternatively, that is connected to an external television converter device for receiving and demodulating analog and/or digital signals for presentation on the local display device 204 (e.g., the local set-top box 202).

Using an integrated television converter device, the local display device 204 may be operable to communicate directly with the transmission network 206. For example, the transmission network 206 may comprise an over-the-air distribution system (e.g., free television), and the local display device 204 may receive television broadcast signals using an internal or external antenna. The transmission network 206 may also comprise a cable television distribution system, and the local display device 204 may comprise a cable ready television adapted to receive and demodulate analog or digital cable television signals for presentation to the local user 106. A direct broadcast satellite or other type of wired or wireless communication network may also be used solely or in conjunction with the foregoing. In at least one embodiment, the local display device 204 may communicate with the transmission network 206 through an intermediate television receiver device, such as the local set-top box 202 that receives and demodulates analog and/or digital signals for presentation on the display device 204 that the display device 204 itself is unable to receive.

The local set-top box 202 is communicatively coupled to the local display device 204 through any type of wired or wireless connection. Exemplary wired connections include coax, fiber, composite video and High-Definition Multimedia Interface (HDMI). Exemplary wireless connections include WiFi and Bluetooth. In at least one embodiment, the local set-top box 202 is embodied in a television converter device (e.g., a satellite television receiver). The local set-top box 202 may also be incorporated into the local display device 204.

As illustrated in FIG. 2, the local set-top box 202 is coupled to a content provider 208 (e.g., a satellite television provider) through the transmission network 206. Thus, the local set-top box 202 receives a television signal (e.g., a broadcast) or other data signal (e.g., digital video data or other data formatted into a video stream) from the transmission network 206, and outputs television programs and other content provided by the content provider 208 to the local display device 204. In at least one embodiment, the local set-top box 202 includes digital video recorder (DVR) functionality that captures and records video content onto a storage medium for subsequent presentation to the local user 106. It is to be appreciated that the local set-top box 202 may capture and record video streams from non-broadcast devices, such as video recorders, DVD players, personal computers, the internet or other storage devices (e.g., universal serial bus (USB) flash drives).

The local set-top box 202 may include a remote control or other input device (not shown) that the local user 106 may utilize for remotely operating the set-top box 202 and/or the local display device 204. More specifically, a remote control may be operable for controlling the presentation of video and/or other data presented by the local set-top box 202 on the local display device 204. In at least one embodiment, the remote control includes a microphone for capturing audio chat data from the local user 106. In some embodiments, the local set-top box 202 may include a video camera that is internal to the local set-top box 202 or communicatively coupled to the local set-top box 202 to capture video and/or audio chat data from the local user 106.

The chat data is transmitted by the local set-top box 202 to a remote set-top box 210 located remotely with respect to the local set-top box 202. For example, the local set-top box 202 may be located in a different building, city or even country than the remote set-top box 210. However, it is to be appreciated that the relative locations of the local set-top box 202 and the remote set-top box 210 may be significantly closer. For example, the local set-top box 202 and the remote set-top box 210 may be located in different rooms of the same building.

The remote set-top box 210 may be similar in configuration and functionality to the local set-top box 202, and is communicatively coupled to a remote display device 212. The remote set-top box 210 is communicatively coupled to the local set-top box 202 through the transmission network 206. In at least one embodiment, the local set-top box 202 and the remote set-top box 210 communicate over the same communication path as each receives a broadcast television signal. For example, the local set-top box 202 and the remote set-top box 210 may receive both broadcast video content and chat data over a broadband connection. In other embodiments, the transmission network 206 may include multiple communication paths for providing video content and chat data to the local set-top box 202 and the remote set-top box 210. For example, the local set-top box 202 and the remote set-top box 210 may receive video content from the content provider 208 over a satellite television distribution network, and may communicate with each other through a broadband connection. In some embodiments, the local set-top box 202 and the remote set-top box 210 may receive video content over disparate communication paths. For example, the local set-top box 202 may receive video content over a satellite television distribution network, and the remote set-top box 210 may receive video content over a cable television distribution network.

The remote set-top box 210 receives chat data from the local set-top box 202, and outputs the chat data for presentation to the remote user 214, on the remote display device 212, in association with the presentation content received from the content provider 208. For example, the chat data may include video data that is presented by the remote display device 212 simultaneously with video content of a football game in a PIP mode. Likewise, the remote set-top box 210 captures chat data of the remote user 214, and transmits the chat data to the local set-top box 202 for presentation to the local user 106.

In at least one embodiment, the local set-top box 202 records the chat data received from the remote-set top box 210 for subsequent presentation to the local user 106. For example, while watching the football game with a PIP video chat display, the local user 106 may perform trick play operations on the video chat data (e.g., rewind, fast forward or pause the video chat data). In some embodiments, the local user 106 may desire to subsequently experience the chat data at a later time without experiencing the original video content that corresponds with the chat data. For example, the local user 106 may desire to see their friend's reaction to a touchdown in the football game several days later.

In some embodiments, the local set-top box 202 records audio or video data of the local user 106 for subsequent presentation to the local user 106. In other words, as the local set-top box 202 captures and transmits audio and/or video chat data of the local user 106 to the remote set-top box 210, the local set-top box 202 may record the audio and/or video chat data for later viewing.

In at least one embodiment, the local set-top box 202 may be configured to transmit portions of the audio and/or video chat data to third party recipients through a third party presentation device 216. For example, the local user 106 may select a portion of the chat data featuring the remote user 214 and transmit the selected portion to the third party presentation device 216. Likewise, if the local set-top box 202 captures audio and/or video chat data of the local user 106, then the local user 106 may select portions of the chat data for transmission to a third party recipient. The third party presentation device 216 comprises any type of device capable of receiving and presenting content to a user, such as another set-top box, television, computer, personal digital assistant (PDA), mobile or wireless telephone and the like.

The content provider 208 comprises any source or sources of television or other video signals. In at least one embodiment, the content provider 208 provides a television broadcast signal to the set-top box 202 over the transmission network 206. The content provider 208 may be a television station that generates and provides the content or may be a television service that provides retransmission of television signals (e.g., a satellite television provider). It is to be appreciated that the content provider 208 may also provide some retransmission services while generating and providing some original or derivative content.

The transmission network 206 may comprise any type of communication network utilized between the set-top box 202 and the content provider 208. Exemplary communication networks include television distribution networks (e.g., over-the-air, satellite and cable television networks), wireless communication networks, public switched telephone networks (PSTN), and local area networks (LAN) or wide area networks (WAN) providing data communication services. The transmission network 206 may utilize any desired combination of wired (e.g., cable and fiber) and/or wireless (e.g., cellular, satellite, microwave, and radio frequency) communication mediums and any desired network topology (or topologies when multiple mediums are utilized). The local set-top box 202 and/or the remote set-top box 210 may communicate with the transmission network 206 through a wired or wireless connection. The transmission network 206 may distribute television broadcast and other data signals in digital or analog form. Exemplary video formats include moving pictures expert group (MPEG), flash, Windows Media, and the like. Content distribution system 200 may include other elements or components not illustrated for the sake of brevity.

Figure 3:
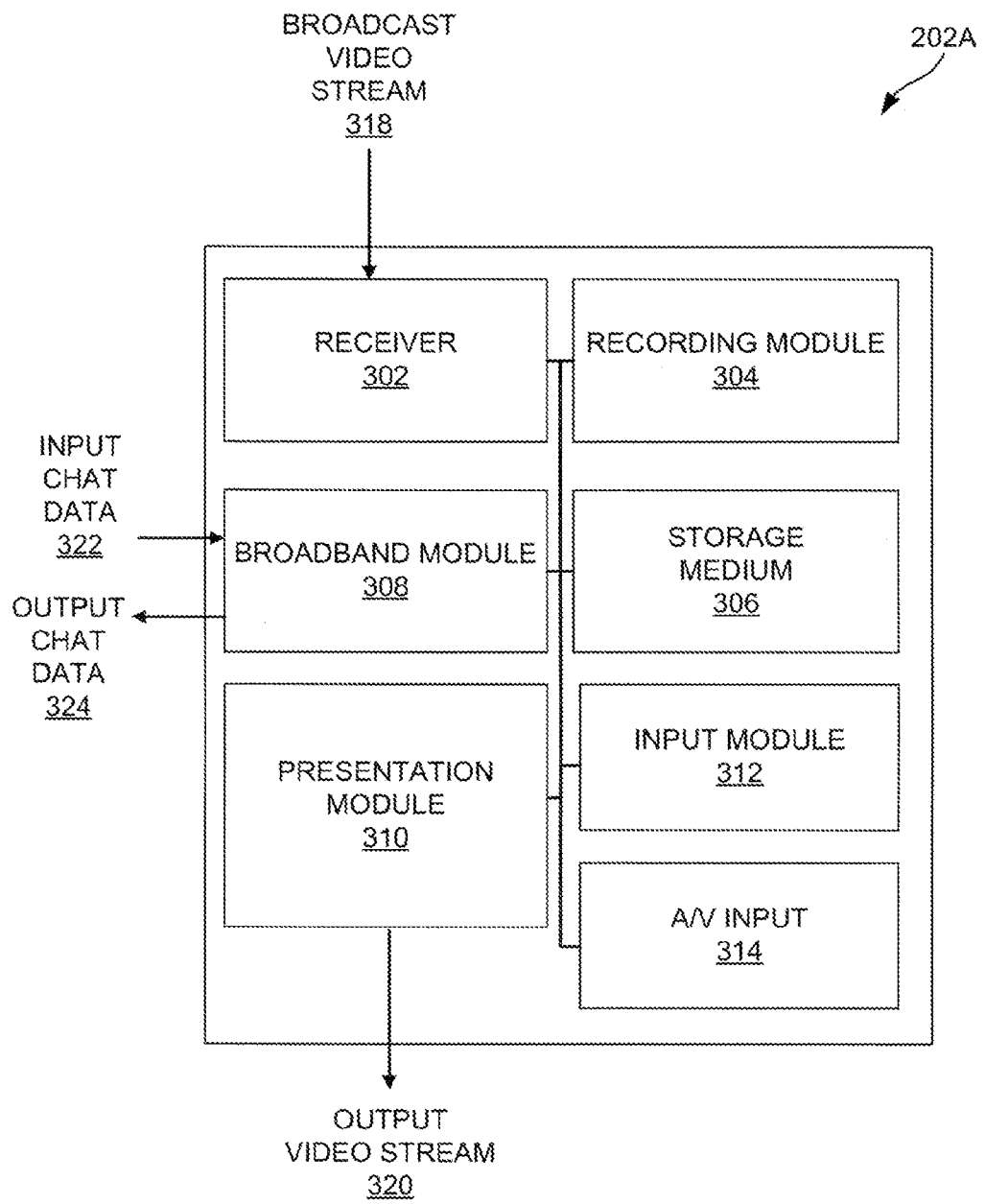
FIG. 3 illustrates an embodiment of functional components of the local set-top box of FIG. 2.

FIG. 3 illustrates an embodiment of functional components of the local set-top box 202A of FIG. 2. FIG. 3 will be discussed in reference to the content distribution system 200 illustrated in FIG. 2. The local set-top box 202A comprises a receiver 302, a recording module 304, a storage medium 306, a broadband module 308, a presentation module 310, an input module 312, an audio/video (A/V) input 314 and a camera 316. Each of these components is discussed in greater detail below.

The receiver 302 receives a broadcast video stream 318 from the transmission network 206 (see FIG. 2). The receiver 302 may comprise a wired or wireless receiver. In at least one embodiment, the receiver 302 receives the broadcast video content from a satellite television distribution system. If necessary, the receiver 302 may perform demodulation and/or filtering of the broadcast video stream 318 signal to generate a format utilized by the presentation module 310. The receiver 302 may further receive other data (e.g., chat data)

from the transmission network 206. In at least one embodiment, the receiver 302 may also include transmitter functionality to transmit data across the transmission network to the content provider 208 (see FIG. 2) or the remote set-top box 210. For example, the local set-top box 202 may transmit chat data to the remote set-top box 210 through the satellite television distribution network.

The broadband module 308 is connected to a broadband data network and provides bi-directional data transmission between the local set-top box 202 and the remote set-top box 210. Thus, the broadband module 308 receives input chat data 322 from the remote set-top box 210 and transmits output chat data 324 to the remote set-top 210. In at least one embodiment, the broadband module 308 is an Ethernet connection communicatively coupled to the internet or other type of data communication network. It is to be appreciated that other types of wired and wireless broadband connections may be utilized.

The presentation module 310 is configured to receive the broadcast video stream and the input chat data 322 and output an output video stream 320 for presentation on the display device 204 (see FIG. 2). In at least one embodiment, the output video stream 320 comprises a PIP or split screen video signal generated based on the broadcast video stream 318 and the input chat data 322. The presentation module 310 may also retrieve recorded content stored on the storage medium 306 to output the output video stream 320. For example, the presentation module 310 may generate an output video stream 320 based on recorded television shows and/or recorded chat data stored on the storage medium. The presentation module 310 may also generate and output other video data, such as menus and user interfaces, for presentation on the display device 204 (see FIG. 2). In at least one embodiment, the A/V input 314 is a Bluetooth receiver/transmitter configured to wirelessly communicate with Bluetooth enabled devices, such as microphones, cameras and mobile telephones. Thus, the A/V input 314 may capture audio data, video data, text data and/or image data from a Bluetooth enabled device.

The input module 312 is configured to receive user input data from the local user 106. In at least one embodiment, the input module 312 communicates with external input devices, such as remote controls, keyboards, mice, mobile telephones and the like. In at least one embodiment, the input module 312 is an infrared (IR) or radio frequency (RF) transmitter/receiver configured to wirelessly communicate with a television remote control (not shown). The remote control may be configured to remotely control output of the output video stream 320 by the local set-top box 202A. In at least one embodiment, a remote control may be configured to remotely control the capture of chat data by the camera 316. In at least one embodiment, the input module 312 is a keypad, touch screen or other input device mounted on a casing of the local set-top box 202A.

The A/V input 314 is communicatively coupled to a camera 316 that captures video data of the local user 106 (see FIG. 2). In at least one embodiment, the camera 316 includes a microphone for capturing audio data associated with the video data of the local user 106. In some embodiments, the A/V input 314 may be communicatively coupled to a microphone (not shown) rather than the camera 316, and the microphone may capture audio data of the local user 106. The camera 316 may be internal or external to the local set-top box 202A. For example, the camera 316 may be mounted to an external casing of the local set-top box 202A. The camera 316 may also communicatively couple to the A/V input 314 through a wired or wireless connection, such as a universal serial bus (USB) cable or a Bluetooth connection. Responsive to the A/V input 314 capturing chat data from the local user 106, the broadband module 308 transmits the output chat data 324 over the transmission network 206 to the remote set-top box 210.

The recording module 304 is configured to record video streams and other A/V data to the storage medium for subsequent presentation. In at least one embodiment, the recording module 304 receives the broadcast video stream 318 and stores the broadcast video stream 318 to the storage medium. In some embodiments, the recording module 304 receives the input chat data 322 and stores the input chat data 322 to the storage medium for subsequent presentation. In at least one embodiment, the remote user 106 may experience the input chat data 322 at a later time or may perform trick mode functions (e.g., rewind) during viewing of the broadcast video stream 318. The storage medium 306 may be any type of temporary or persistent storage device capable of storing the broadcast video stream 318 and the input chat data 322. The storage medium 306 may be internal and/or external to the local set-top box 202A. For example, the storage medium 306 may be an internal hard drive or flash memory. The broadcast video stream 318 and the input chat data 322 may be stored together and/or separately on the storage medium 306.

Those of ordinary skill in the art will appreciate that the various functional elements 302 through 316 shown as operable within the local set-top box 202A may be combined into fewer discrete elements or may be broken up into a larger number of discrete functional elements as a matter of design choice. For example, the broadband module 308, the recording module 304, the input module 312, the A/V input 314 and/or the presentation module 310 may be combined into one or more processors or processing modules. Thus, the particular functional decomposition suggested by FIG. 3 is intended merely as exemplary of one possible functional decomposition of elements within the local set-top box 202.

Figure 4:
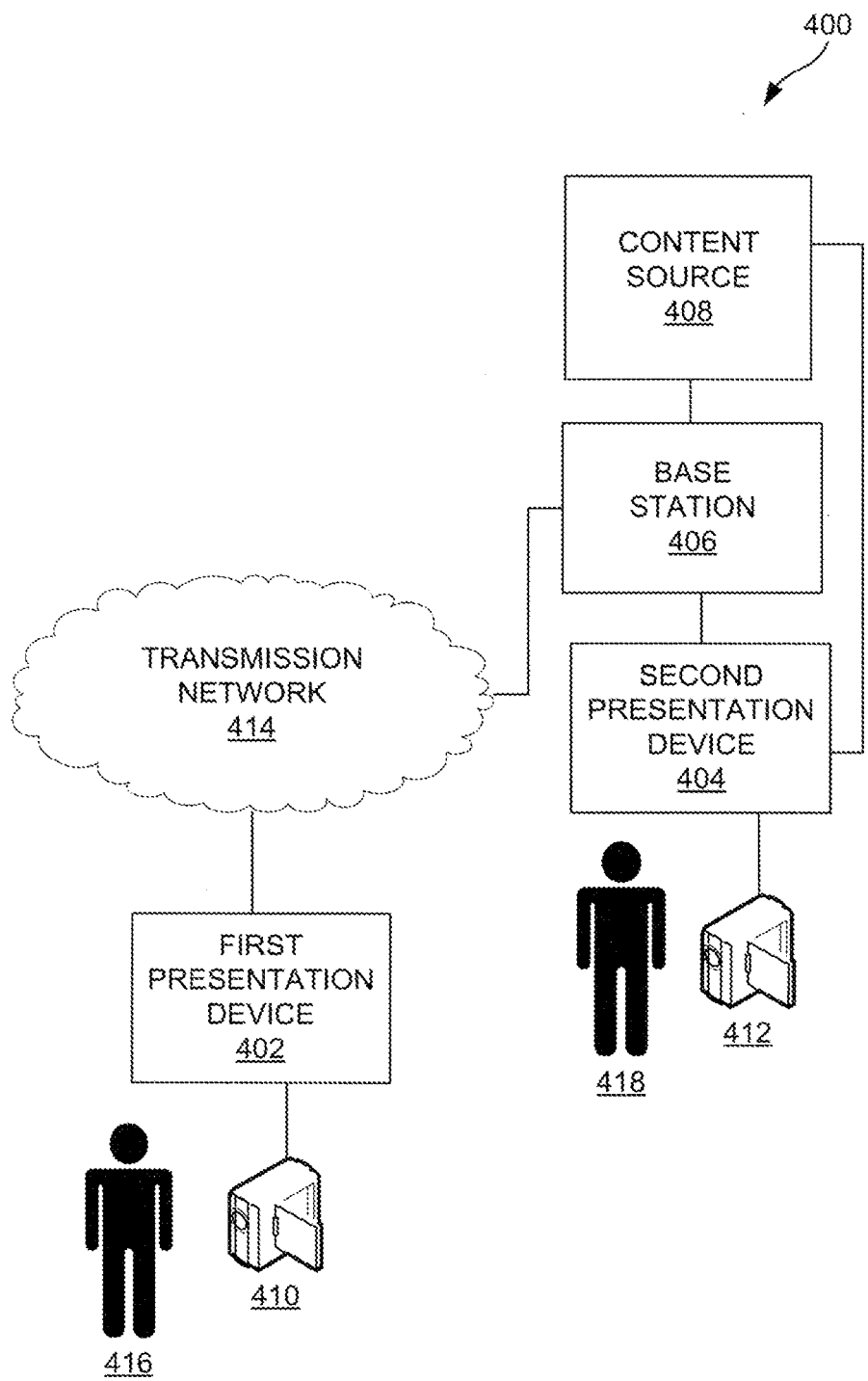
FIG. 4 illustrates an embodiment of a communication system.

In at least one embodiment, a set-top box or other presentation device may receive both chat data and video content in a composite signal from a single signal source. FIG. 4 illustrates an embodiment of a communication system 400. More particularly, FIG. 4 illustrates a communication system 400 in which at least one presentation device receives video content and chat data from a single source. The communication system 400 includes a first presentation device 402, a second presentation device 404, a base station 406, a content source 408, a first video capture device 410, a second video capture device 412 and a transmission network 414. Each of the components of FIG. 4 will be discussed in greater detail below.

The first presentation device 402 may be any type of device capable of receiving and displaying video content to a user 416. For example, the first presentation device 402 may be a television, mobile communication device, mobile computer, personal computer and the like. The first presentation device 402 is communicatively coupled to the transmission network 414 and receives chat data and video content from the transmission network 414. The chat data and the video content are received in a composite signal outputted by the base station 406. For example, the base station 406 may output the video chat data in a PIP screen of the video content.

The first presentation device 402 may be communicatively coupled to the transmission network over any type of wired or wireless communication link. In at least one embodiment, the transmission network 414 comprises a data network, e.g., the internet, and the first presentation device 402 is communicatively coupled to the transmission network through a wired or wireless broadband communication link. In some embodiments, the first presentation device 402 may be communicatively coupled to the transmission network 414 through an intermediate device, such as a set-top box. For example, the first presentation device 402 may comprise a television communicatively coupled to the transmission network 414, e.g., a broadband network, through a cable television or satellite television set-top box.

The first presentation device 402 is further communicatively coupled to a first video capture device 410. The first video capture device 410 captures video chat data of the user 416 located locally with respect to the first presentation device 402. In other words, the user 416 is sitting near the first presentation device 402. The first presentation device 402 (or an intermediate set-top box and the like) communicatively coupled to the first presentation device 402 transmits the captured video chat data of the user 416 to the base station 406 through the transmission network 414 for presentation on the second presentation device 404. The first video capture device 410 may be internal or external to the first presentation device 402. For example, the first presentation device 402 may comprise a laptop computer with an integrated webcam. In at least one embodiment, the first video capture device 410 may be integrated within a television set-top box or the like communicatively coupled to the first presentation device 402.

The second presentation device 404 may be any type of device capable of receiving and displaying video content to the user 418. The second presentation device 404 may be communicatively coupled to the transmission network 414 directly or through an intermediate device, such as the base station 406.

The second presentation device 404 may be similar to the first presentation device 402 and may be located remotely with respect to the first presentation device 402. For example, the first and second presentation devices 402 and 404 may both comprise televisions or laptop computers. Alternatively, the first and second presentation devices 402 and 404 may be disparate devices. For example, the first presentation device 402 may comprise a laptop computer communicatively coupled to the transmission network, and the second presentation device 404 may comprise a television communicatively coupled to the transmission network 414 through the base station 406 (e.g., a television set-top box with an integrated broadband connection). The content source 408 is communicatively coupled to the second presentation device 404 and provides video content to the second presentation device 404.

The second video capture device 412 is configured to capture video chat data of the second user 418. The second user 418 is located locally with respect to the second presentation device. In other words, the second user 418 is sitting near the second presentation device 404. The video capture device 412 and/or the second presentation device 404 transmit the captured video chat data of the second user 418 to the base station 406 for further transmission to the first presentation device 402.

The base station 406 may comprise any type of device capable of combining two video signals into a composite signal and transmitting the composite signal to the first presentation device 402 over the transmission network 414. The base station 406 is communicatively coupled to the content source 408 and receives video content therefrom. The content source 408 may comprise any type of device or system that provides video content to the base station 406. For example, the content source 408 may comprise an over-the-air broadcast, a satellite or cable television distribution system, DVR, DVD or other optical disk player, the internet or other communication network and the like. In at least one embodiment, the base station 406 is integrated within the content source 408. For example, the base station 406 may be integrated within a television receiver set-top box.

In at least one embodiment, the base station 406 may be integrated within the second presentation device 404. For example, the second presentation device 404 may comprise a laptop that also receives and transmits video content and chat data to the first presentation device 402. It is to be appreciated that the second presentation device 404, the base station 406 and the content source 408 may all be integrated within a single apparatus, such as a computer, television/DVR and the like.

The base station 406 receives the video content from the content source 408 and the video chat data of the user 418 from the second video capture device 412 and generates a composite signal therefrom. The composite signal is then transmitted by the base station 406 to the first presentation device 402 for presentation to the user 416. Thus, the first presentation device 402 receives both video content and chat data from the same source. The base station 406 further receives the chat data of the user 416 from the first presentation device 402 and responsively outputs the chat data to the second presentation device 404 for presentation to the user 418. Thus, the base station 406 facilitates the transmission of chat data between the first presentation device 402 and the second presentation device 404 while further providing the first presentation device 402 with video content from the remotely located content source 408.

In at least one embodiment, the first presentation device 402 may transmit commands to the base station 406 to control the output of video content included in the composite signal. For example, the first presentation device 402 may receive input from the user 416 that requests swapping of the PIP screens outputted by the base station 406. A command may further request manipulation of the output by the content source 408. For example, the content source 408 may comprise a television receiver, and the input from the user 416 may request to change the channel outputted by the television receiver. In other embodiments, the content source 408 may comprise a DVR, and the input from the user 416 may request to perform trick play mode functions (e.g., fast-forwarding, reversing, pausing and the like) or change the video outputted by the content source 408. The first presentation device 402 receives the input from the user 416 and transmits the command to the base station 406. The base station 406 receives the command and responsively transmits the command to the content source 408. The content source 408 then operates to process the command and manipulate the output of the video content accordingly. The command may be transmitted between the base station 406 and the content source 408 using any type of communication link or protocol, such as radio frequency (RF), infrared (IR) or other types of wired or wireless communication links. In the embodiment illustrated in FIG. 4, the user 416 can thus manipulate the output of video content from the content source 408 located remotely with respect to the first presentation device 402.

Figure 5:
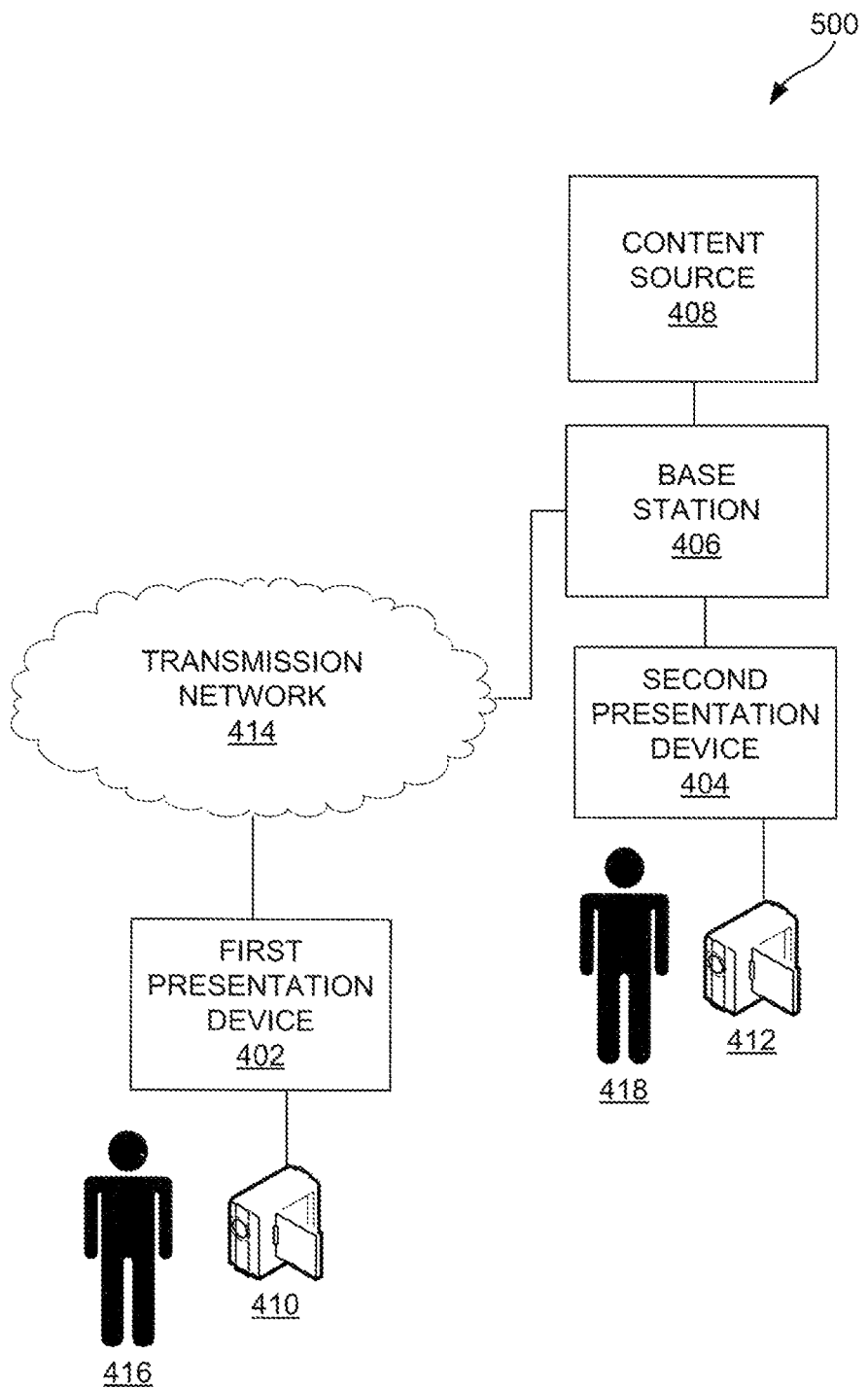
FIG. 5 illustrates another embodiment of a communication system.

As illustrated in FIG. 4, the second presentation device 404 is communicatively coupled to the content source 408. The presentation device 404 may also be coupled to the content source 408 through the intermediate base station 406. FIG. 5 illustrates another embodiment of a communication system 500. More particularly, FIG. 5 illustrates a communication system 500 in which a base station provides video content and chat data to multiple connected presentation devices. FIG. 5 includes components common to FIG. 4, and description of these components is omitted herein for sake of brevity.

In at least one embodiment, the base station 406 is configured to further output a second composite signal to the second presentation device 404 for presentation to the user 418. The base station 406 receives video content from the content source 408 and chat data of the first user 416 from the first presentation device 402 and responsively generates a second composite signal for output to the second presentation device 404. The second composite signal may be similar to the first composite signal outputted by the base station 406 to the first presentation device 402. For example, the chat data of the first user 416 may be combined with the video content from the content source 408 and outputted to the second presentation device 404.

In at least one embodiment, the base station 406 is capable of outputting two different versions of the video content received from the content source 408. Thus, while both users 416 and 418 are effectively watching the same content, each user 416 and 418 may independently manipulate the video content displayed by the presentation devices 402 and 404. For example, each user 410 and 418 may independently perform trick play mode functions on the video content. In other embodiments, the base station 406 outputs a single version of the video content to both presentation devices 402 and 404. Thus, when one user manipulates the video content through a command transmitted to the base station 406, the content displayed to the user will be affected by the aforementioned command.

Figure 6:
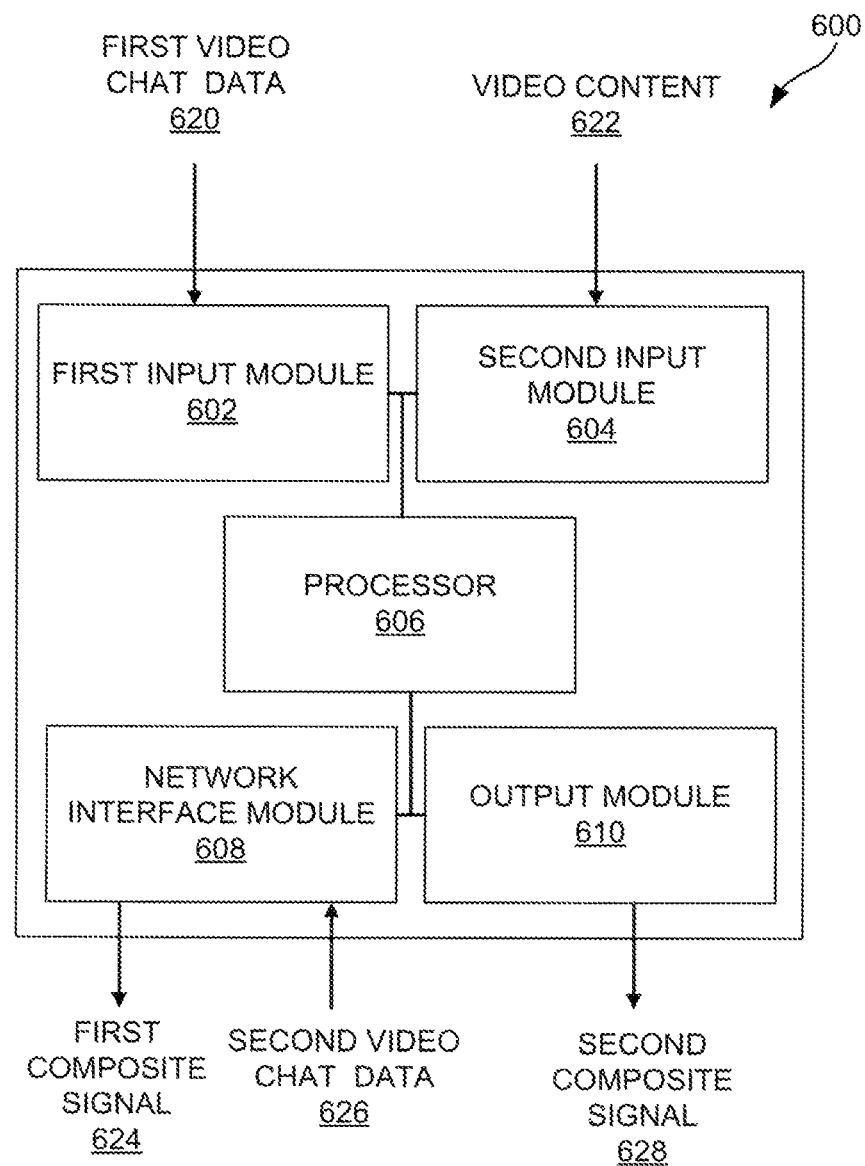
FIG. 6 illustrates an embodiment of functional components of the base station of FIGS. 4-5.

FIG. 6 illustrates an embodiment of functional components of the base station 406A of FIGS. 4-5. FIG. 6 will be discussed in reference to the communication systems 500 and 600 illustrated in FIGS. 4-5. The base station 406A comprises a first input module 602, a second input module 604, a processor 606, a network interface module 608 and an output module 610. Each of these components is discussed in greater detail below.

The first input module 602 of the base station 406A receives first video chat data 620 of a user 418 located locally with respect to a presentation device 404. The first input module 602 receives the first video chat data 620 from the first video capture device 412. The first input module 602 may be communicatively coupled to the presentation device 404 through any type of wired or wireless communication link. In at least one embodiment, the first input module 602 may be communicatively coupled to the video capture device 410 through an intermediate device, such as the presentation device 404.

The second input module 604 of the base station 406A receives video content 622 provided by a content source 408. The second input module 604 may be communicatively coupled to the content source 408 through any type of wired or wireless communication link, such as coaxial cable, component cables, WiFi and the like. In at least one embodiment, the content source 408 is integrated with the base station 406.

The processor 606 of the base station 406A operates to combine the first video chat data 620 and the video content 622 into a first composite signal 624. The processor 606 may be configured to perform various video processing techniques, such as video compression, transcoding and the like. For example, at least one of the first video chat data 620 and the video content 622 may be captured in analog form, and the processor 606 may be operable to digitize the received analog video to generate the first composite signal 624 in a digital format. In at least one embodiment, the processor 606 may manipulate the output of the video content within the first composite signal 624 based on commands received from the presentation device 402.

A network interface module 608 of the base station 406A communicatively couples to another presentation device 402 located remotely with respect to the base station 406A. The network interface module 608 and the presentation device 402 may communicate over any type of network topology and communication link. The network interface module 608 transmits the first composite signal 624 to the presentation device 402.

The presentation device 402 concurrently transmits to the network interface module 608 second video chat data 606 of a second user 416 located locally with respect to the presentation device 402. An output module 610 of the base station 406A outputs the second video chat data 610 for presentation on the presentation device 402. In at least one embodiment, the processor 606 is operable to combine the video content 622 and the second video chat data 626 into a second composite signal 628. The generation of the second composite signal 628 may be performed similarly to the generation of the first composite signal 624. Thus, the base station 406A facilitates communication between two users 416 and 418 while also facilitating presentation of similar content to both users 416 and 418.

Those of ordinary skill in the art will appreciate that the various functional elements 602 through 610 shown as operable within the base station 406A may be combined into fewer discrete elements or may be broken up into a larger number of discrete functional elements as a matter of design choice. For example, the first input module 602, the second input module 604, the network interface module 608 and the output module 610 may be combined into one or more communication modules. Thus, the particular functional decomposition suggested by FIG. 6 is intended merely as exemplary of one possible functional decomposition of elements within the base station 406A.

Figure 7:
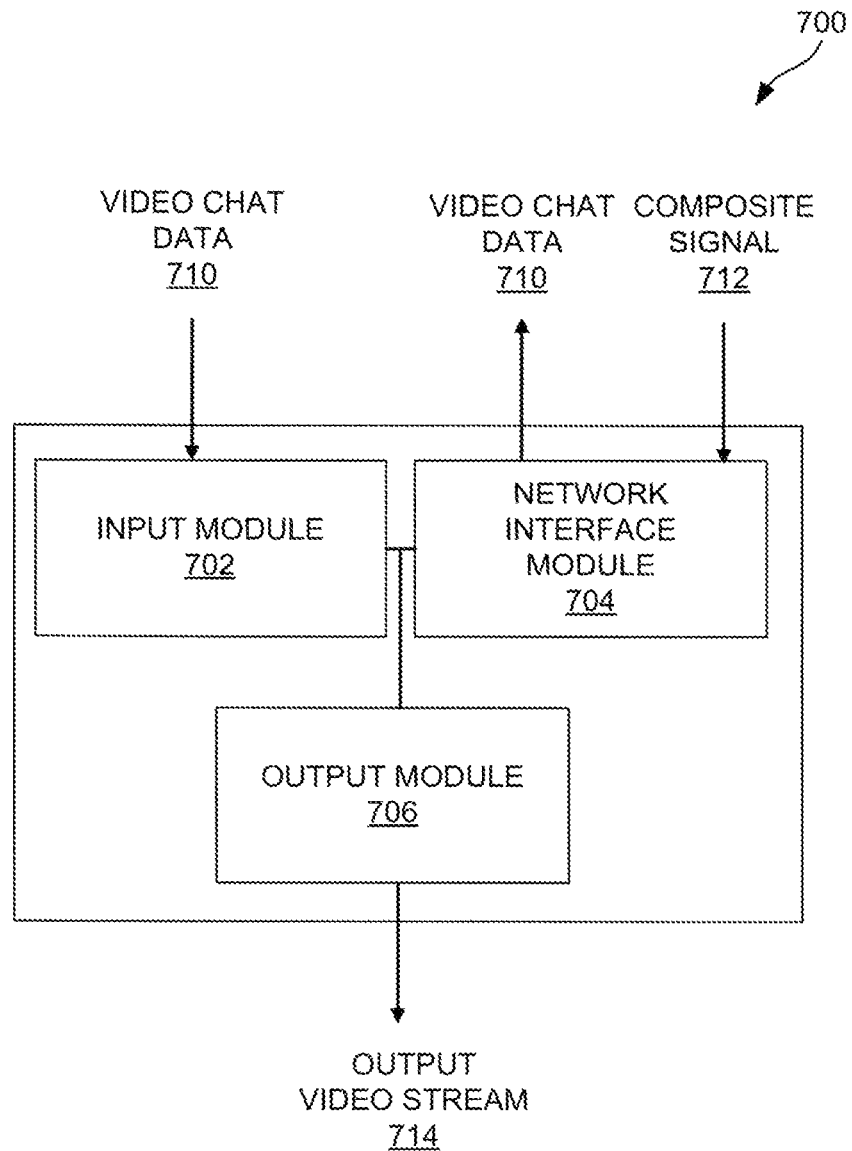
FIG. 7 illustrates an embodiment of an apparatus for presenting video content and chat data to a user.

FIG. 7 illustrates an embodiment of an apparatus 700 for presenting video content and chat data to a user. The apparatus 700 may comprise a presentation device or an intermediate device, e.g., a set-top box, communicatively coupled to a presentation device. The apparatus includes an input module 702, a network interface module 704 and an output module 706. Each of these components will be discussed in greater detail below.

The input module 702 of the apparatus 700 is communicatively coupled to a video capture device, e.g., a video camera, and receives first video chat data 710 of a first user located locally with respect to a presentation device communicatively coupled to the apparatus 700. The video capture device may be communicatively coupled to the input module 702 through any type of wired or wireless communication link. In at least one embodiment, the video capture device is integrated with the apparatus 700. For example, the apparatus 700 may comprise a laptop computer with an integrated webcam. The input module 702 may be further configured to receive input from a user. For example, the input module 702 may receive commands from a user requesting to manipulate the output of content outputted for presentation by the apparatus 700. These received commands may be further transmitted to a base station via the network interface module 704.

The network interface module 704 transmits the video chat data 710 to a base station located remotely with respect to the apparatus 700 (and the presentation device communicatively coupled to the apparatus 700). The network interface module 704 may communicatively couple to the base station using any type of wired or wireless communication link and using any type of network topology. For example, the network interface module 704 may comprise an Ethernet port that communicatively couples to the base station over the internet.

The network interface module 704 further receives a composite signal from the base station. The composite signal includes video content provided by a content source located remotely with respect to the apparatus 700 and second video chat data captured of a second user located remotely with respect to the apparatus 700 (and its associated presentation device). In at least one embodiment, the content source is located locally with respect to the base station.

The output module 706 of the apparatus 700 outputs the composite signal in an output video stream 714 for display on the presentation device communicatively coupled to the apparatus 700. The output module 706 may be communicatively coupled to a presentation device using any type of wired or wireless communication link. The output module 706 may be configured to perform various processing and formatting operations on the composite signal 712 prior to generating the output video stream 714. In at least one embodiment, the apparatus 700 includes an integrated presentation device, e.g., a display and/or speakers for presenting the output video stream 714.

Figure 8:
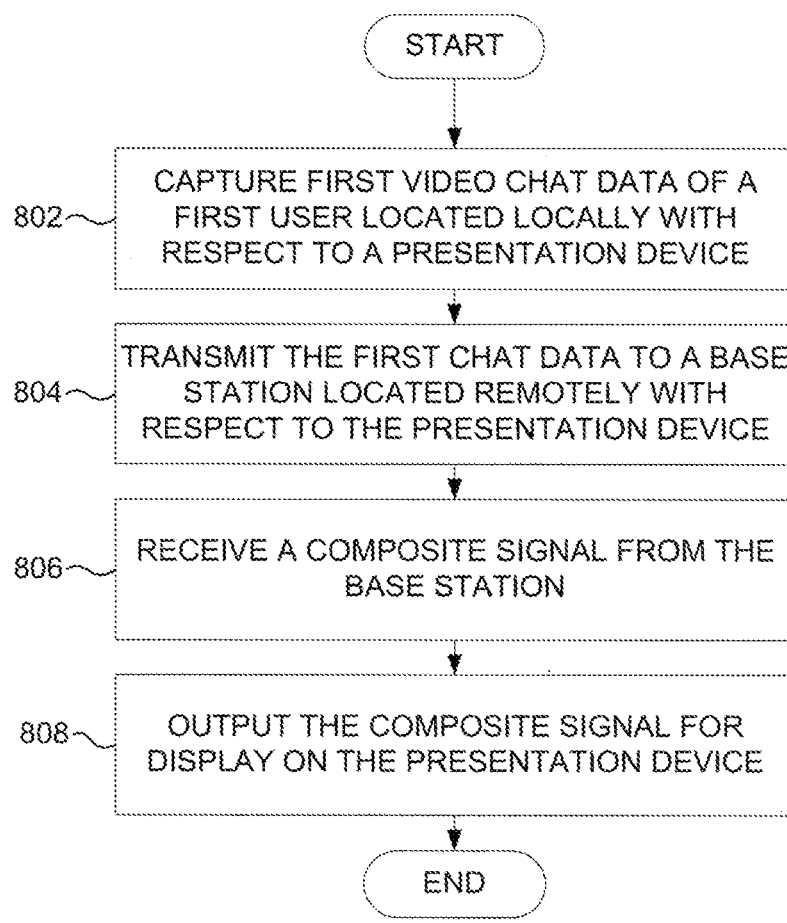
FIG. 8 illustrates an embodiment of a process for providing video communication between users.

FIG. 8 illustrates an embodiment of a process for providing video communication between multiple users. However, it is to be appreciated that the operation of the process of FIG. 8 may be applied to provide communication between viewers watching any type of video stream content, such as television content, DVD videos, recorded content, video on-demand (VOD) content and the like. The operations of the process of FIG. 8 are not all-inclusive, and may comprise other operations not illustrated for the sake of brevity.

The process includes capturing first video chat data of a first user located locally with respect to a presentation device (operation 802). The first video chat data may be captured by any type of analog and/or digital video camera and the like. The first video chat data may be digitized and/or compressed after capture for optimal transfer across a communication network.

The process further includes transmitting the first chat data to a base station located remotely with respect to the presentation device (operation 804). The first chat data may be transmitted to the base station over any type of communication network using any type of communication protocol. In at least one embodiment, the first chat data is transmitted to the base station using an internet protocol (IP).

The process further includes receiving a composite signal from the base station (operation 806). The composite signal includes video content provided by a content source communicatively coupled to the base station and further includes second video chat data captured of a second user located remotely with respect to the presentation device.

The process further includes outputting the composite signal for display on the presentation device (operation 808). In at least one embodiment, the composite signal may be outputted from a set-top box or the like to a separate presentation device. In another embodiment, the presentation device receives the composite signal directly from the base station and displays the composite signal on a display screen of the presentation device.

Although specific embodiments were described herein, the scope of the invention is not limited to those specific embodiments. The scope of the invention is defined by the following claims and any equivalents therein.

What is claimed is:

1. A method for providing video communication between users, the method comprising:
    capturing first video chat data of a first user located locally with respect to a presentation device of the first user;
    transmitting the first chat data to a base station of a second user located remotely with respect to the presentation device;
    receiving a composite signal from the base station of the second user, the composite signal including video content provided by a content source communicatively coupled to the base station and further including second video chat data captured of the second user located remotely with respect to the presentation device;
    outputting the composite signal for display on the presentation device of the first user; and
    transmitting a command from the presentation device of the first user to the base station of the second user, wherein the command manipulates presentation of the video content included in the composite signal.

2. The method of claim 1, further comprising:
    transmitting the command from the base station to the content source, wherein the command manipulates the video content outputted by the content source.

3. The method of claim 2, further comprising:
    outputting the manipulated video content from the content source to a second presentation device located locally with respect to the second user.

4. The method of claim 2, wherein transmitting the command further comprises:
    transmitting the command from the presentation device to the content source through the base station, the command requesting to change the content outputted by the content source.

5. The method of claim 4, wherein the content source comprises a digital video recorder, and the command requests to change a video outputted by the digital video recorder.

6. The method of claim 4, wherein the content source comprises a television tuner device, and the command requests to change a channel outputted by the television tuner device.

7. An apparatus comprising:
    an input module that receives from a video capture device first video chat data of a first user located locally with respect to a presentation device of the first user;
    a network interface module communicatively coupled to the input module that transmits the first chat data to a base station of a second user located remotely with respect to the presentation device of the first user, that receives a composite signal from the base station of the second user, the composite signal including video content provided by a content source located remotely with respect to the apparatus and further including second video chat data captured of the second user located remotely with respect to the presentation device of the first user; and
    an output module communicatively coupled to the network interface module that outputs the composite signal for display on the presentation device of the first user,
    wherein the input module receives a command from the first user, and the network interface module transmits the command to the base station of the second user, wherein the command manipulates the video content included in the composite signal.

8. The apparatus of claim 7, wherein the command manipulates the video content outputted by the content source.

9. The apparatus of claim 8, wherein the command requests a change to the content outputted by the content source.

10. The apparatus of claim 9, wherein the content source comprises a digital video recorder, and the command requests to change a video outputted by the digital video recorder.

11. The apparatus of claim 9, wherein the content source comprises a television tuner device, and the command requests to change a channel outputted by the television tuner device.

12. The apparatus of claim 7, wherein the apparatus comprises a mobile communication device.

13. A base station comprising:
a first input module that receives from a first video capture device first video chat data of a first user located locally with respect to a first presentation device and the base station;
a second input module that receives video content provided by a content source;
a processor communicatively coupled to the first input module and the second input module, the processor operable to combine the first video chat data and the video content into a composite signal;
a network interface module communicatively coupled to the processor that transmits the composite signal to a second presentation device located remotely with respect to the base station and that receives second video chat data of a second user captured by a second video capture device located locally with respect to the second presentation device; and
an output module communicatively coupled to the network interface module that outputs the second video chat data for presentation on the second presentation device of the second user,
wherein, the network interface module receives a command from the second presentation device of the second user, the second command requesting manipulation of the video content; and the processor transmits the command to the content source, the content source manipulating output of the video content based on the command.

14. The base station of claim 13, wherein the processor is further operable to combine the second video chat data and the video content into a second composite signal, and wherein the output module outputs the second composite signal for presentation on the second presentation device.

15. The base station of claim 13, wherein the base station is integrated within a digital video recorder.

16. The base station of claim 13, wherein the base station is integrated within a television tuner device.

17. The base station of claim 13, wherein the base station is integrated within the first presentation device.

* * * * *